United States Patent
Park et al.

(10) Patent No.: US 7,924,485 B2
(45) Date of Patent: Apr. 12, 2011

(54) COLOR DISPERSION COMPENSATED HOLOGRAPHIC LIGHT GUIDE PLATE

(75) Inventors: Seung-ryong Park, Seoul (KR);
Seok-ho Song, Seoul (KR); Hong-seok Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 690 days.

(21) Appl. No.: 11/712,437

(22) Filed: Mar. 1, 2007

(65) Prior Publication Data

US 2008/0043302 A1  Feb. 21, 2008

(30) Foreign Application Priority Data

Aug. 21, 2006 (KR) .................. 10-2006-0078765

(51) Int. Cl.
*G02B 5/32* (2006.01)

(52) U.S. Cl. ......................... 359/15; 359/575
(58) Field of Classification Search .............. None
See application file for complete search history.

(56) References Cited

U.S. PATENT DOCUMENTS

| | | | | |
|---|---|---|---|---|
| 5,742,433 A | * | 4/1998 | Shiono et al. | 359/575 |
| 6,773,126 B1 | * | 8/2004 | Hatjasalo et al. | 362/601 |
| 6,865,319 B2 | * | 3/2005 | Painchaud | 385/37 |
| 2006/0279963 A1 | * | 12/2006 | Kim et al. | 362/619 |

* cited by examiner

*Primary Examiner* — Stephone B Allen
*Assistant Examiner* — Derek S Chapel
(74) *Attorney, Agent, or Firm* — Sughrue Mion, PLLC

(57) ABSTRACT

A holographic light guide plate has a transparent substrate and a plurality of diffraction patterns formed thereon. The diffraction patterns are arranged on one of a top surface and a bottom surface of the transparent substrate. The diffraction patterns diffract light incident on the transparent substrate. Each of the diffraction patterns has a continuously varying interval.

9 Claims, 13 Drawing Sheets

COLOR DISPERSION COMPENSATED HOLOGRAPHIC LIGHT GUIDE PLATE

CROSS-REFERENCE TO RELATED PATENT APPLICATION

This application claims priority from Korean Patent Application No. 10-2006-0078765, filed on Aug. 21, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to a holographic light guide plate, and more particularly, to a holographic light guide plate with improved color dispersion, a manufacturing method and apparatus of the same, and an illumination unit for a display device using the holographic light guide plate.

2. Description of the Related Art

Figure 1:
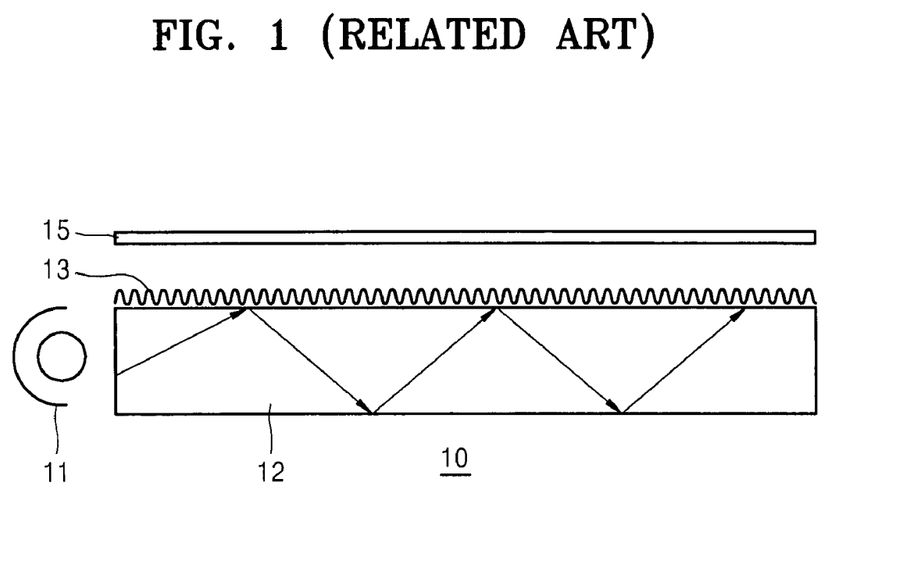
FIG. 1 is a schematic sectional view of a illumination unit for a related art display device using a holographic light guide plate.

Non-emissive displays such as liquid crystal displays (LCDs) generally require a separate illumination apparatus such as a back light unit. FIG. 1 is an exemplary schematic view of a unit for a related art display device, with a holographic light guide plate. Referring to FIG. 1, a unit 10 of a related art display device includes a light guide plate 12 with a fine diffraction pattern formed on its upper or lower surface, a light source 11 disposed at a side of the light guide plate 12, and a diffusion plate 15 that evenly diffuses light that is emitted from the upper surface of the light guide plate 12.

Generally, a point light source such as a light emitting diode (LED) or a line light source such as a cold cathode fluorescent lamp (CCFL) may be used as a light source 11. The white light emitted from the light source 11 is incident on the light guide plate 12 made of a poly methyl meth acrylate (PMMA) with high light transmittance, for example. Such incident light proceeds along the inside of the light guide plate 12 through total reflection. Because a diffraction pattern 13 is formed on the upper surface of the light guide plate 12, a portion of the light incident on the upper surface of the light guide plate 12 is diffracted and emitted through the upper surface of the light guide plate 12 by means of the diffraction pattern 13. The light that is emitted through the upper surface of the light guide plate 12 is evenly diffused through a diffuser sheet 15, to illuminate a non-emissive display device, such as an LCD.

Figure 2:
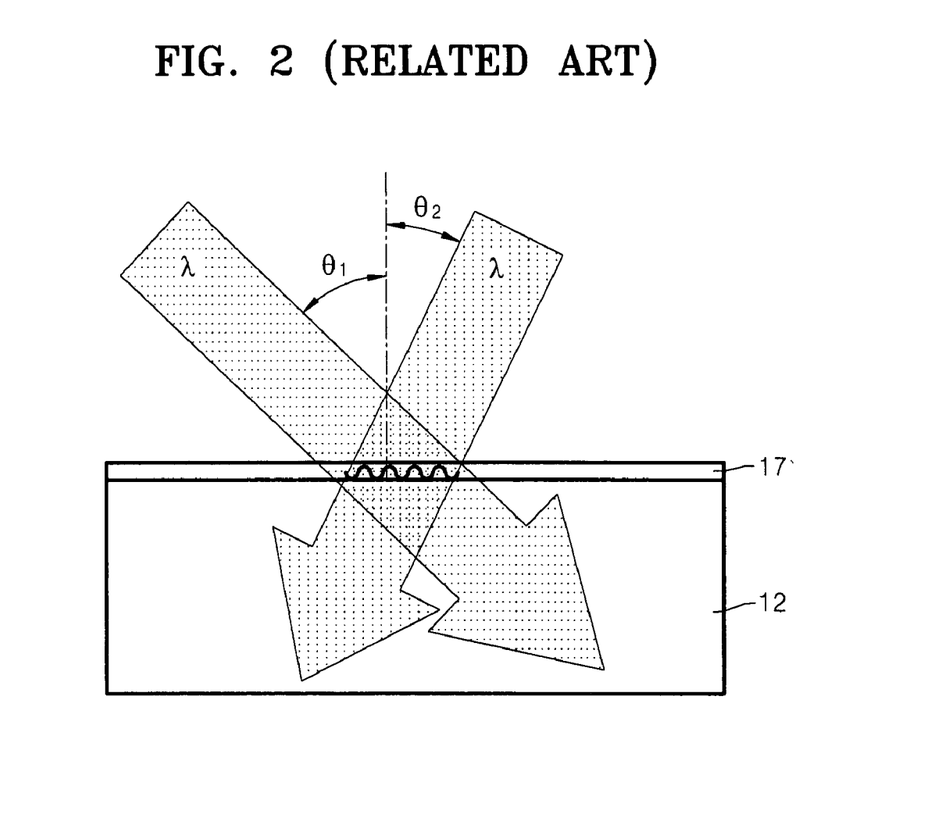
FIG. 2 is a sectional view illustrating an exemplary related art method of forming a holographic light guide plate with a single period diffraction pattern.

Methods of forming such diffraction patterns 13 include mechanically carving the pattern in the surface of the light guide plate 12, pressing a stamp with the diffraction pattern formed thereon against the surface where the diffraction pattern 13 is to be formed, and using laser beam interference. FIG. 2 illustrates a method of using laser beam interference to form a diffraction pattern 13 on a holographic light guide plate 12. Referring to FIG. 2, a photoresist 17 is applied on the surface of a light guide plate 12, and two parallel laser beams having the same wavelengths are simultaneously emitted to intersect on the photoresist 17. Interference between the two intersecting laser beams occurs, and the photoresist 17 is exposed in a diffraction pattern, and the exposed photoresist 17 is developed, forming a diffraction pattern in the same shape as the interference pattern on the light guide plate 12. Thereafter, light guide plates having the same diffraction pattern as that formed above are mass-produced through molding or injection molding methods.

Figure 3:
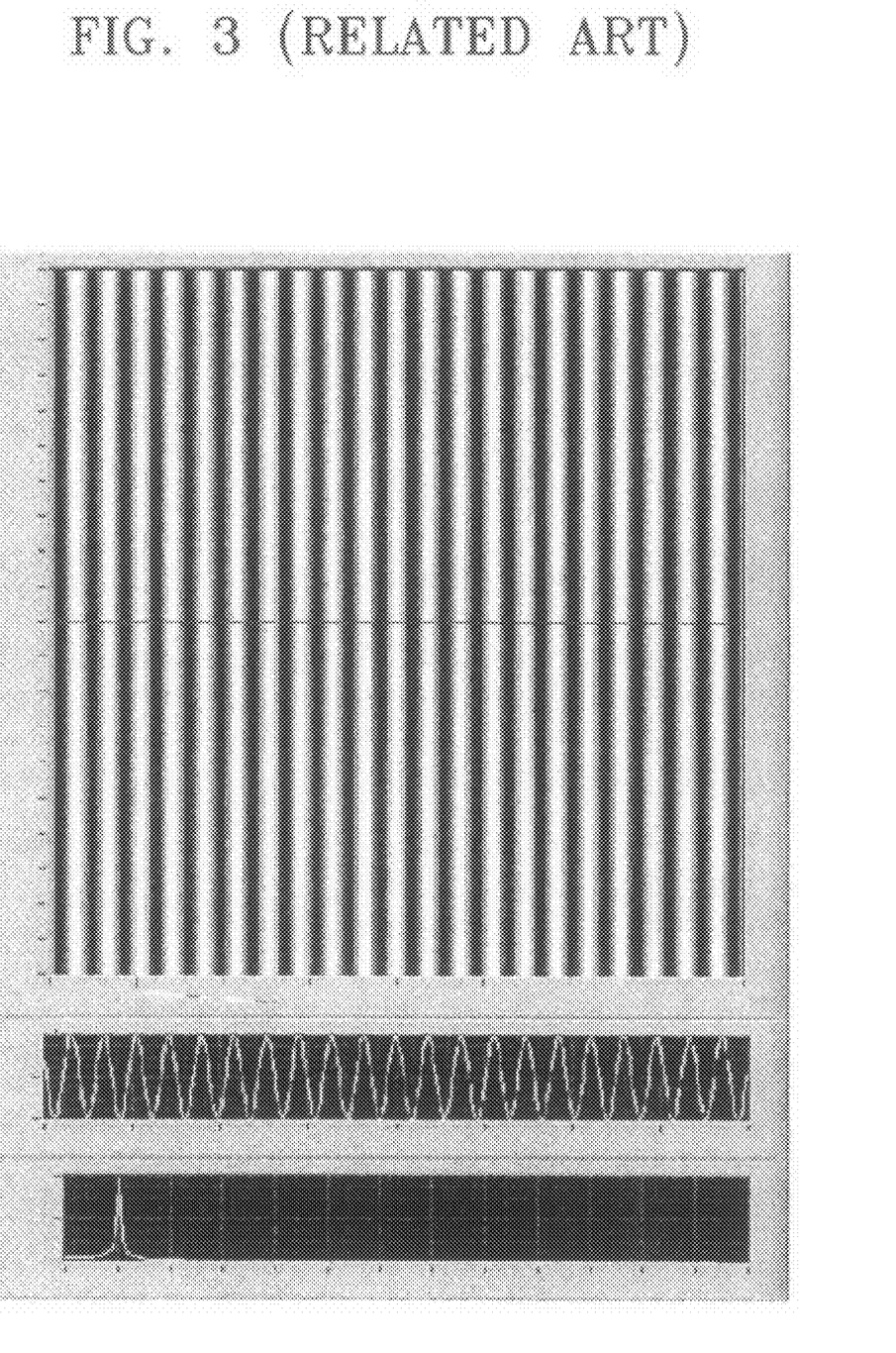
FIG. 3 illustrates a diffraction pattern of a related art holographic light guide plate formed by the method in FIG. 2, and a Fourier transformation result of a sectional view thereof.

FIG. 3 illustrates the shape of a diffraction pattern formed using a laser beam interference method, light distribution along a section thereof, and a Fourier transformation result of the light distribution. Referring to FIG. 3, as illustrated at the upper portion, the diffraction pattern formed on the entire surface of the light guide plate, has a uniform and single period distribution. In the section of FIG. 3 immediately therebelow, a related distribution of light has uniform peaks of light distribution corresponding to the diffraction pattern. The Fourier transformation illustrated at the bottom of FIG. 3 shows that the diffraction pattern has a single period distribution. The period of this diffraction pattern is determined by the angles ($\theta_1$ and $\theta_2$ in FIG. 2) and the wavelength $\lambda$ of the two parallel laser beams, as illustrated in the following equation.

$$\Lambda = \frac{\lambda}{(\sin\theta_1 + \sin\theta_2)}$$

Figure 4A:
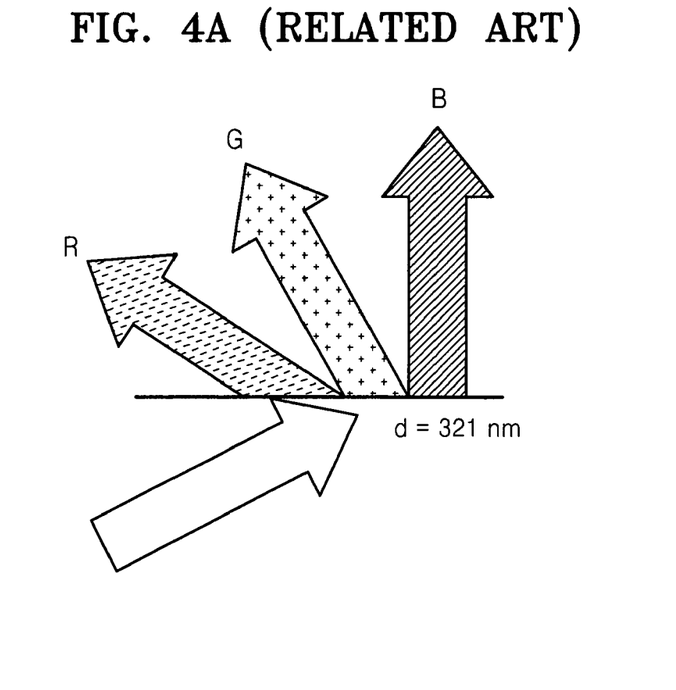
FIG. 4A through 4C illustrate examples of color dispersion through a single period diffraction pattern.
Figure 4B:
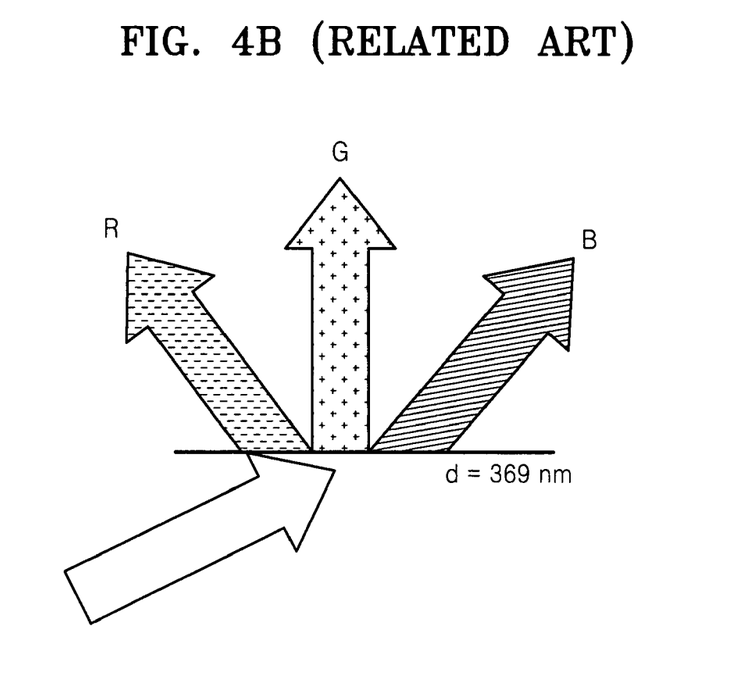
Figure 4C:
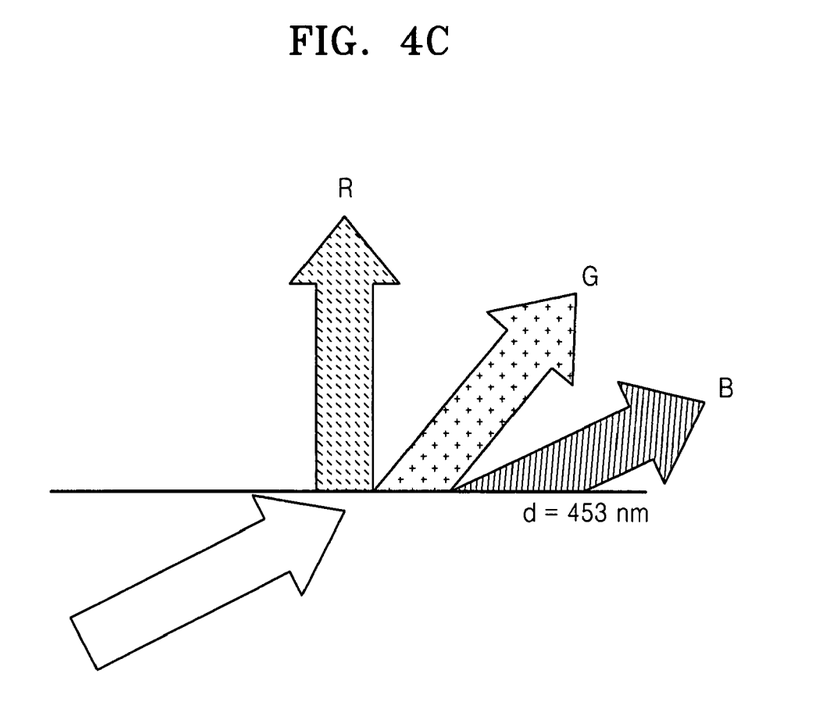

However, because the refractive index and transmissivity of light vary according to its wavelength, color dispersion of white light occurs when it is transmitted to the upper surface of the light guide plate by the diffraction pattern. FIGS. 4A through 4C illustrate the above color dispersion, and show the exit angles for each of the red (R), green (G), and blue (B) colors according to the period of the diffraction pattern. Here, it is assumed that the refractive index of the light guide plate is n=1.59, the total reflection angle in the light guide plate is 39°, and the progressing angle of light at its center in the light guide plate is 64.5°. Here, when the wavelength of the red light is 620 nm, the wavelength of the green light is 530 nm, and the wavelength of the blue light is 460 nm, blue light, green light, and red light are emitted vertically when the period of the diffraction pattern is d=321 nm, d=369 nm, and d=453 nm, respectively. Accordingly, when a diffraction pattern having a single period is used, the emitted angle of light differs according to the wavelength of light, so that color dispersion results from the diffraction pattern.

In order to help solve this problem, a remedy using a combination of diffraction patterns with two or more different periods has been proposed. For example, when a combination of diffraction patterns with periods of 321 nm, 369 nm, and 453 nm are used, red, green, and blue light are combined in a vertical direction to produce white light. However, as illustrated in FIGS. 4A through 4C, the red, green, and blue light in non-vertical direction is not uniform, so that color dispersion still remains a problem.

SUMMARY OF THE INVENTION

Exemplary embodiments of the present invention provide a holographic light guide plate that compensates for color dispersion in all directions.

Exemplary embodiments of the present invention also provide a light unit for a display device using a holographic light guide plate that is compensated for color dispersion.

Exemplary embodiments of the present invention further provide a method and apparatus for manufacturing a holographic light guide plate compensated for color dispersion in all directions.

According to an aspect of the present invention, there is provided a holographic light guide plate including: a transparent substrate; and a plurality of diffraction patterns arranged on one of a top surface and a bottom surface of the transparent substrate, wherein the diffraction patterns diffract light incident on the transparent substrate, and wherein each of the diffraction patterns has a continuously varying period distribution.

The period distributions and directions of the diffraction patterns may be different from each other.

The period distribution of the diffraction patterns may vary within a range of periods through which red, green, and blue lights are emitted vertically.

Each of the diffraction patterns may have an area of not greater than 1 mm$^2$.

According to another aspect of the present invention, there is provided an illumination unit for a display device, including: a transparent substrate; at least one light source disposed adjacent to a side of the transparent substrate; and a plurality of diffraction patterns arranged on one of a top surface and a bottom surface of the transparent substrate, wherein the diffraction patterns diffract light incident on the transparent substrate, wherein each of the diffraction patterns has a continuously varying period distribution.

The illumination unit may further include a diffuser sheet disposed above the top surface of the transparent substrate, wherein the diffuser sheet uniformly diffuses the light transmitted through the top surface of the transparent substrate.

According to a further aspect of the present invention, there is provided a method of manufacturing the holographic light guide plate, the method including: applying a photoresist to a top surface of a substrate; simultaneously projecting two light beams having a same wavelength onto the photoresist and thereby forming an interference pattern on the photoresist; and developing the photoresist with the interference pattern formed thereon, wherein at least one of the two light beams is divergent or convergent.

One of the two beams may be a parallel beam, and the other beam may be a divergent beam.

One of the two beams may be a parallel beam, and the other beam may be a convergent beam.

The two beams may both be divergent beams.

The two beams may both be convergent beams.

One of the two beams may be a divergent beam, and the other beam may be a convergent beam.

The photoresist may be divided into a plurality of regions, and in each region, a combination of incident direction and convergence/divergence of the two beams may be varied so that the period distribution and direction of diffraction patterns are varied.

Each of the regions of the photoresist may have an area not greater than 1 mm$^2$.

According to a still further aspect of the present invention, there is provided an apparatus for manufacturing the holographic light guide plate, the apparatus including: a light source which emits light; a light divider which divides the light emitted by the light source into a first beam and a second beam; a support which moves in two-dimensions in a horizontal plane, and which supports a substrate having a photoresist applied thereon; a first light guiding assembly which guides the first beam to be incident on the photoresist; a second light guiding assembly which guides the second beam to be incident on a position of the photoresist on which the first beam is incident; and a lens disposed in at least one of a path of the first beam and a path of the second beam, which causes at least one of the first beam and the second beam to be one of divergent and convergent.

The apparatus may further include a collimating lens disposed between the light source and the light divider, and which makes the light emitted by the light source parallel.

The light source, the light divider, the first light guiding assembly, the second light guiding assembly, and the lens may be rotatable in concert about a vertical axis.

The first light guiding assembly may include a flat mirror which reflects the first beam and a concave mirror which reflects the first beam from the flat mirror towards the photoresist.

The second light guiding assembly may include a flat mirror which reflects the second beam and a concave mirror which reflects the second beam from the flat mirror towards the photoresist.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

As described above, related art color dispersion compensation is performed by combining different diffraction patterns with two or more types of intervals. Generally, the more types of intervals that are combined for a diffraction pattern of a holographic light guide plate, the wider the range of color dispersion compensation achieved. Exemplary embodiments of the present invention provide a method of continuously varying periods of the diffraction pattern within a predetermined range, so that the number of periods of the diffraction pattern increases and color dispersion in a wide range is minimized.

Figure 5:
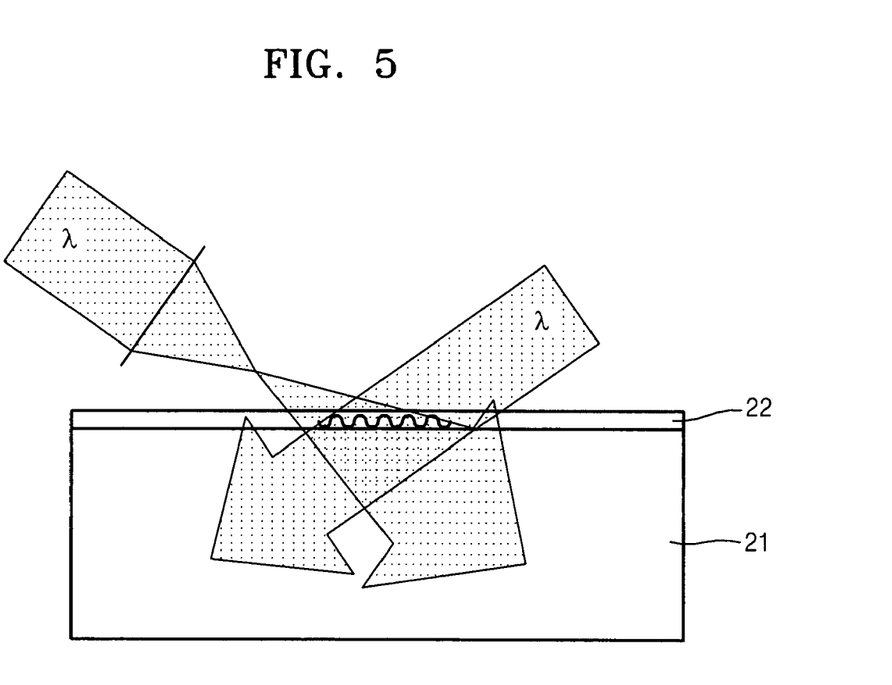
FIG. 5 illustrates an exemplary method of forming a holographic light guide plate with a diffraction pattern with continuously varying period distribution, according to an exemplary embodiment of the present invention.

FIG. 5 illustrates an exemplary method of forming a holographic light guide plate with a diffraction pattern with continuously varying period distribution, according to an exemplary embodiment of the present invention. Referring to FIG. 5, a photoresist 22 is applied on a substrate 21, and two beams with the same wavelength are incident on the photoresist 22 to form a pattern through interference. Here, one of the two beams is a parallel beam, and the other is a divergent beam. Thus, the interference pattern caused the two beams has a period that continuously varies. Accordingly, the exposed pattern formed on the photoresist 22 becomes a continuously varying pattern following the shape of the pattern formed by the interference. Thereafter, the exposed photoresist 22 is developed to form a diffraction pattern in the same shape as an interference pattern with continuously varying periods on the substrate 21. Then, the substrate 21 with the thus formed diffraction pattern is used as a master to mass produce holographic light guide plates with correspondingly shaped diffraction patterns through molding or injection molding techniques. In this case, the substrate 21, as a master substrate, does not need to be transparent. However, it is possible to directly produce holographic light guide plates by depositing and exposing a photoresist on a transparent substrate.

Figure 6:
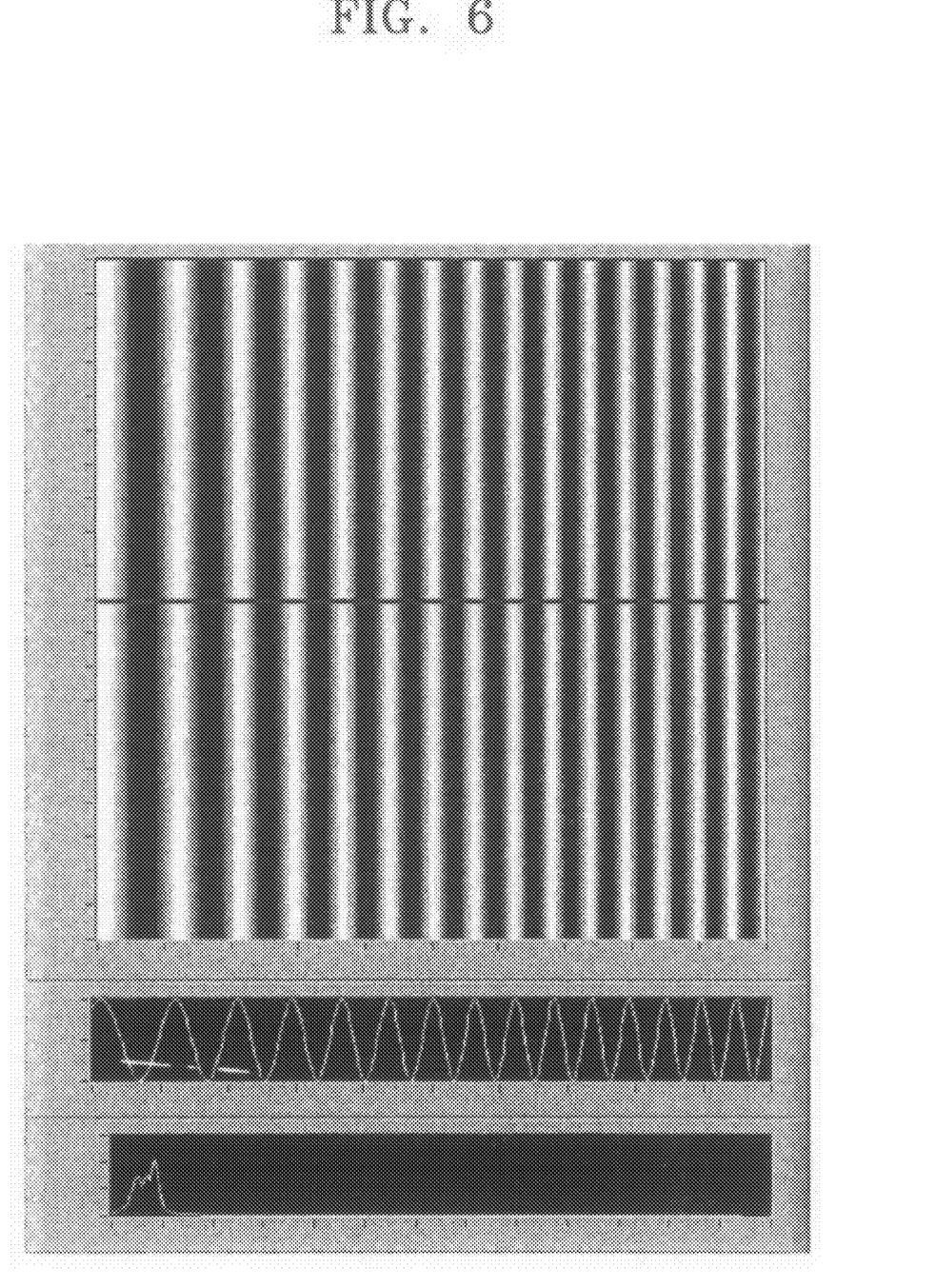
FIG. 6 illustrates a diffraction pattern of a holographic light guide plate formed by the method in FIG. 5, and a Fourier transformation result of a sectional view thereof.

FIG. 6 illustrates a diffraction pattern of a holographic light guide plate formed by the method in FIG. 5, light distribution along a section thereof, and a Fourier transformation result of a sectional view thereof. In the upper portion of FIG. 6, the method in FIG. 5 is used to form a diffraction pattern with a period that increasingly shortens. Thus, as shown in the middle of FIG. 6, the peaks of the light distribution come closer and closer together. As shown at the bottom of FIG. 6, the Fourier transformation result of the diffraction pattern shows a wide period modulation width.

Figure 7:
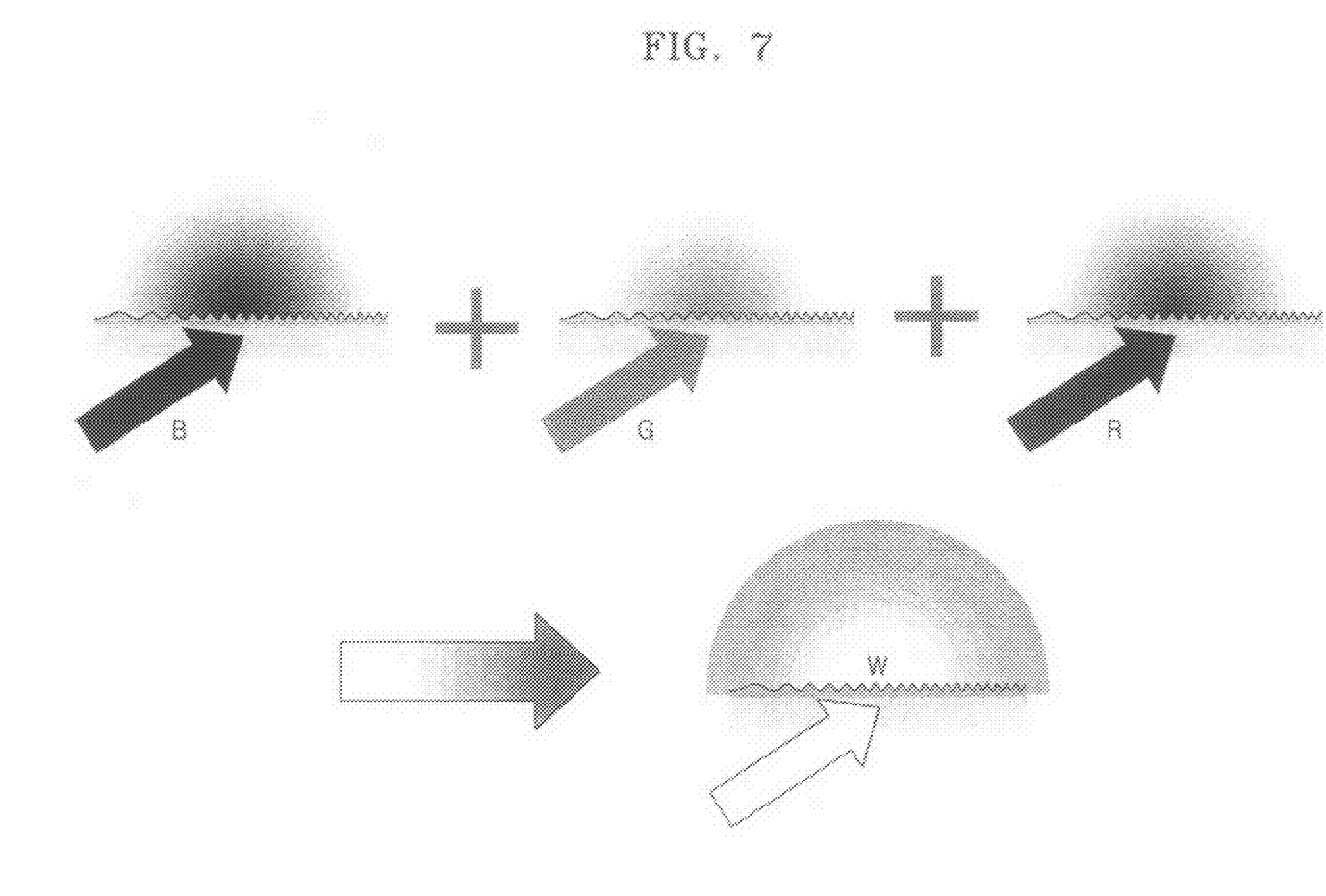
FIG. 7 illustrates the principle of compensating for color dispersion in a holographic light guide plate with a diffraction pattern with continuously varying period distribution, according to an exemplary embodiment of the present invention.

In the holographic light guide plate according to an exemplary embodiment of the present invention, because the period of the diffraction pattern continuously varies, a wide range of wavelengths of light can be diffracted in a wide angular region, as illustrated in FIG. 7. That is, red, green, and blue light can be diffracted within a wide range of angles. Accordingly, light that is emitted through the upper surface of the holographic light guide plate is seen as white light overall. For this end, the holographic light guide plate has a diffraction pattern period range with a period distribution that continuously varies between periods for, perpendicularly emitting red, green, and blue light, respectively. For example, when the refractive index of the transparent substrate 21 is n=1.59, the total reflection angle of light in the transparent substrate 21 is 39°, and the progressing angle of light at its center in the transparent substrate 21 is 64.5°, blue light, green light, and red light are emitted vertically when the periods of the diffraction pattern are d=321 nm, d=369 nm, and d=453 nm, respectively. Accordingly, in a holographic light guide plate of an exemplary embodiment of the present invention, the minimum period of the diffraction pattern is 321 nm or less and the maximum period is 453 nm or more, and the periods of the diffraction pattern continuously vary within this range.

In the method illustrated in FIG. 5, a parallel beam and a divergent beam interfere to form the diffraction pattern. However, the method is not limited thereto, and any combination may be used to form a continuously varying interference pattern. For example, one beam may be a parallel beam and another beam may be a convergent beam, or one beam may be a convergent beam and another beam may be a divergent beam. Alternatively, both beams may be either convergent or divergent beams. For each case, the continuously varying period of the diffraction pattern is different.

Figure 8:
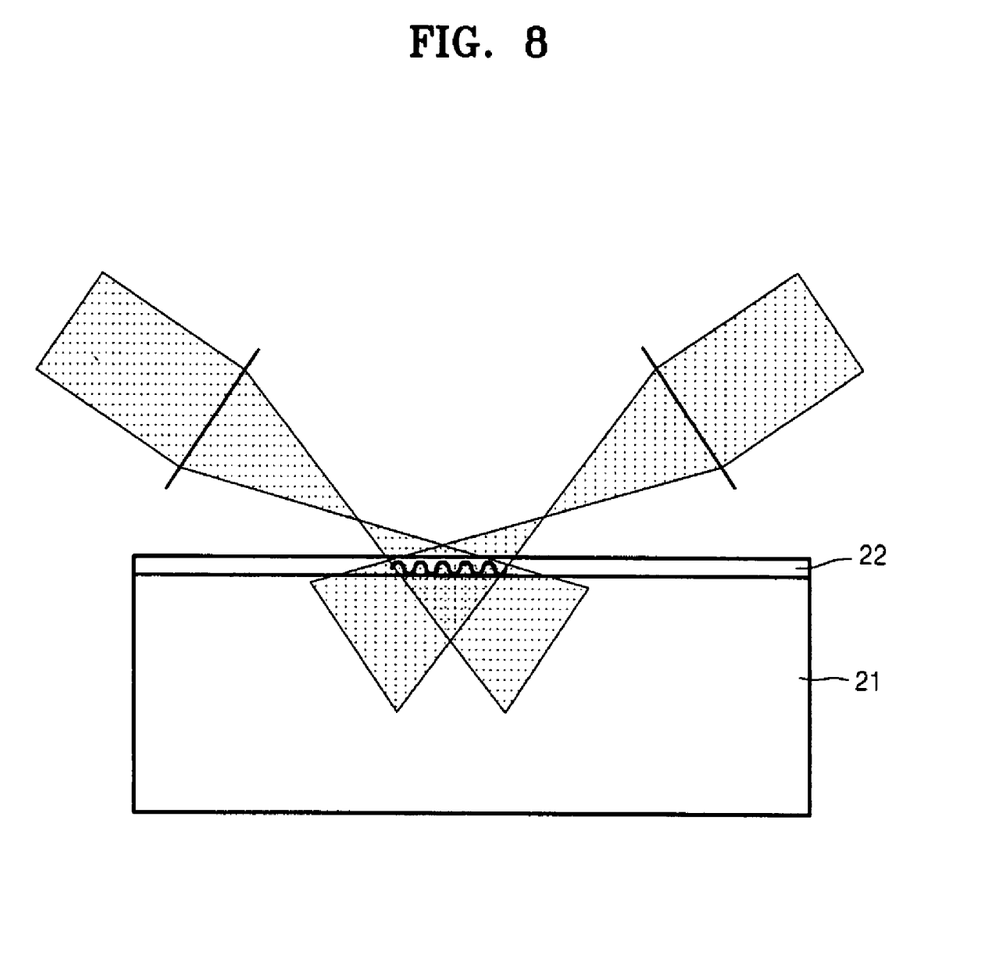
FIG. 8 illustrates a method of forming a holographic light guide plate according to another exemplary embodiment of the present invention.
Figure 9:
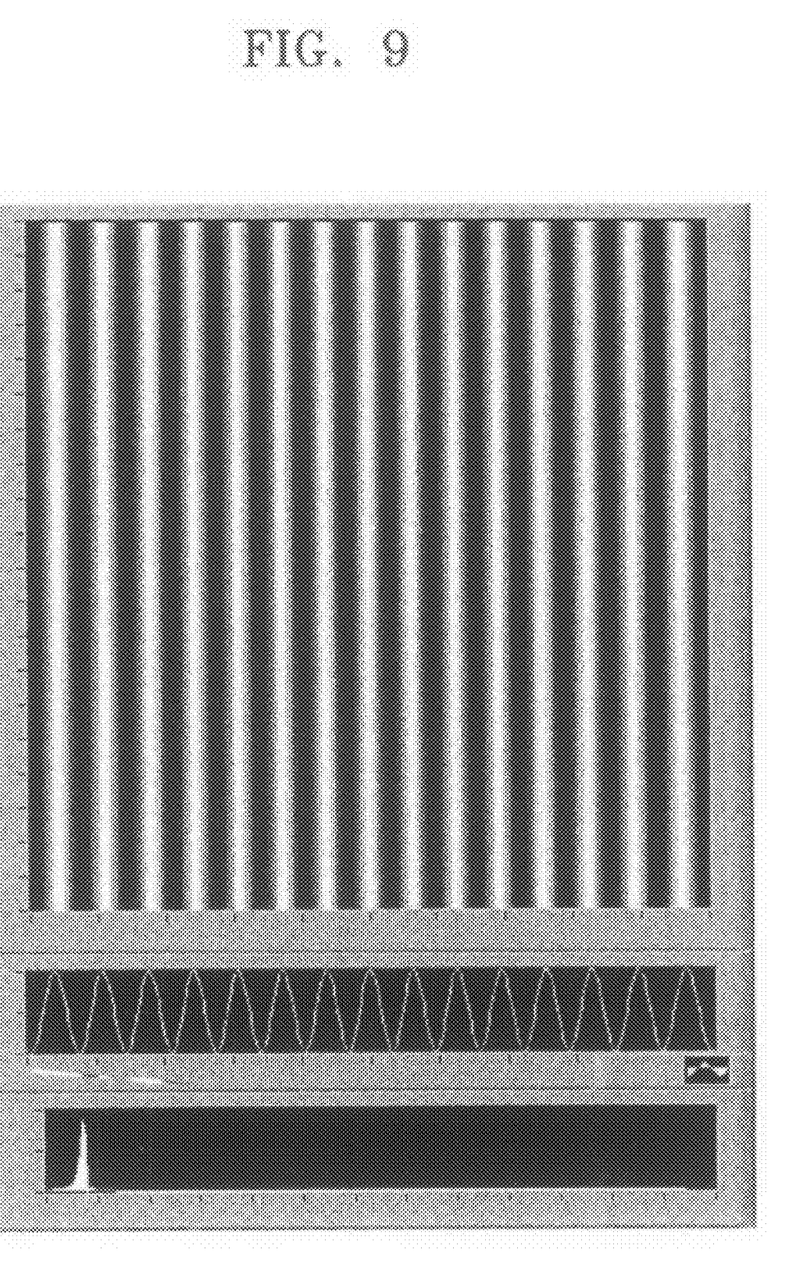
FIG. 9 illustrates a diffraction pattern of a holographic light guide plate formed by the method in FIG. 8, and a Fourier transformation result of a sectional view thereof.

FIG. 8 illustrates a method of forming a diffraction pattern by using interference of two divergent beams, and FIG. 9 illustrates a diffraction pattern of a holographic light guide plate formed by the method in FIG. 8, and a Fourier transformation result of a sectional view thereof. As illustrated in the upper portion of FIG. 9, in the diffraction pattern formed using the method in FIG. 8, the periods of the diffraction pattern continuously shorten towards the middle, and widen again towards the outside. Accordingly, the distribution of light shown in the middle portion of FIG. 9 is the same as the diffraction pattern, such that the periods between the peaks continuously shorten and then widen again. The Fourier transformation result illustrated at the bottom portion of FIG. 9 shows that the period modulation width is wider when compared to that of the related art diffraction pattern in FIG. 3 having a single period.

Figure 10:
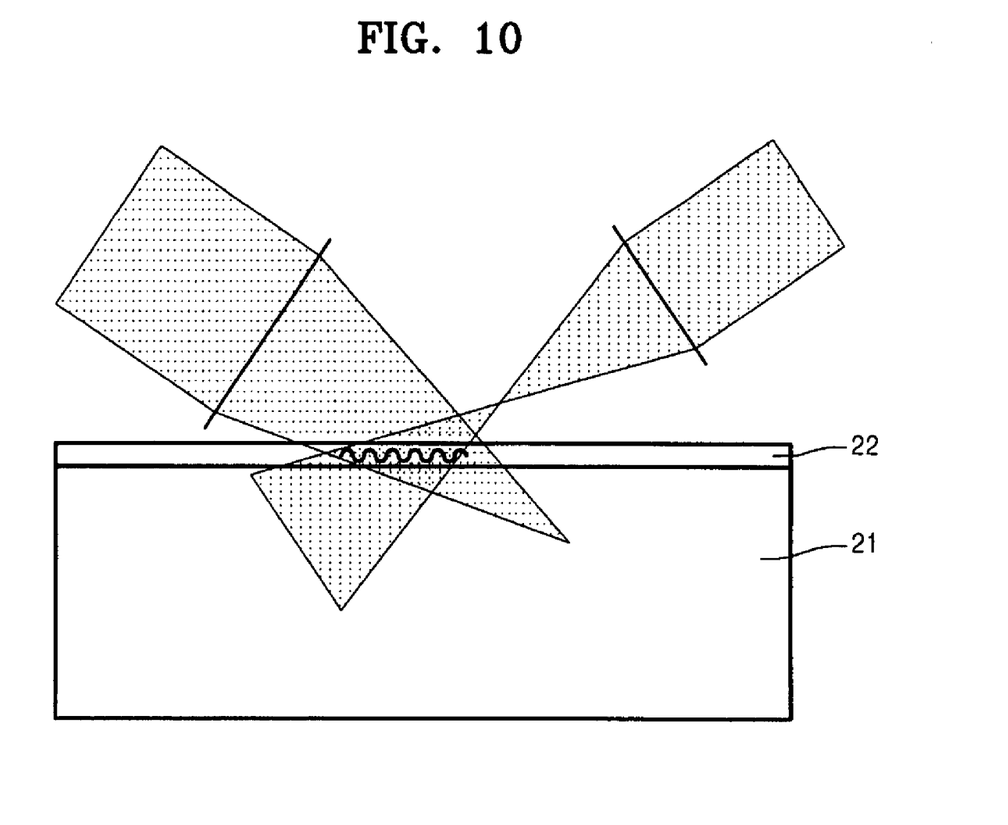
FIG. 10 illustrates an exemplary method of forming a holographic light guide plate according to another exemplary embodiment of the present invention.
Figure 11:
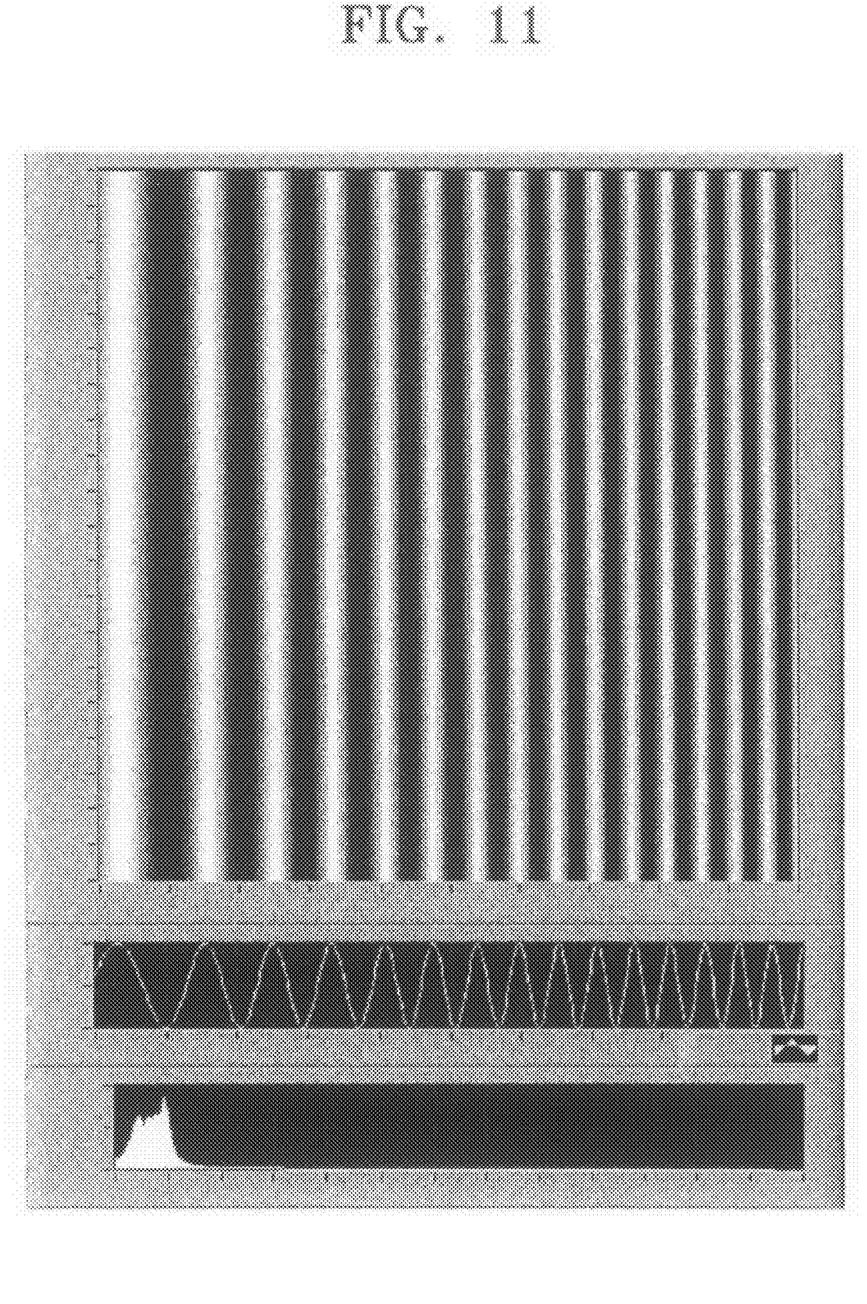
FIG. 11 illustrates a diffraction pattern of a holographic light guide plate formed by the, method in FIG. 10, and a Fourier transformation result of a sectional view thereof.

FIG. 10 illustrates a method of forming a diffraction pattern by using the interference of one convergent beam and one divergent beam, and FIG. 11 illustrates a diffraction pattern of a holographic light guide plate formed by the method in FIG. 10, and a Fourier transformation result of a sectional view thereof. Referring to the upper portion of FIG. 11, in the case of a diffraction pattern formed using the method illustrated in FIG. 10, the diffraction pattern period steeply shortens from left to right and increases slightly toward to the right side. Accordingly, the peaks of the light distribution, as shown in the middle portion of FIG. 11, are the same as the diffraction pattern, with the periods also decreasing suddenly towards the right and slightly increasing on the right side. The Fourier transformation result illustrated at the bottom region of FIG. 11 shows a substantially wide period modulation width. Accordingly, when a diffraction pattern is formed using one convergent beam and one divergent beam, a diffraction pattern with a combination of the widest period range can be obtained.

Figure 12:
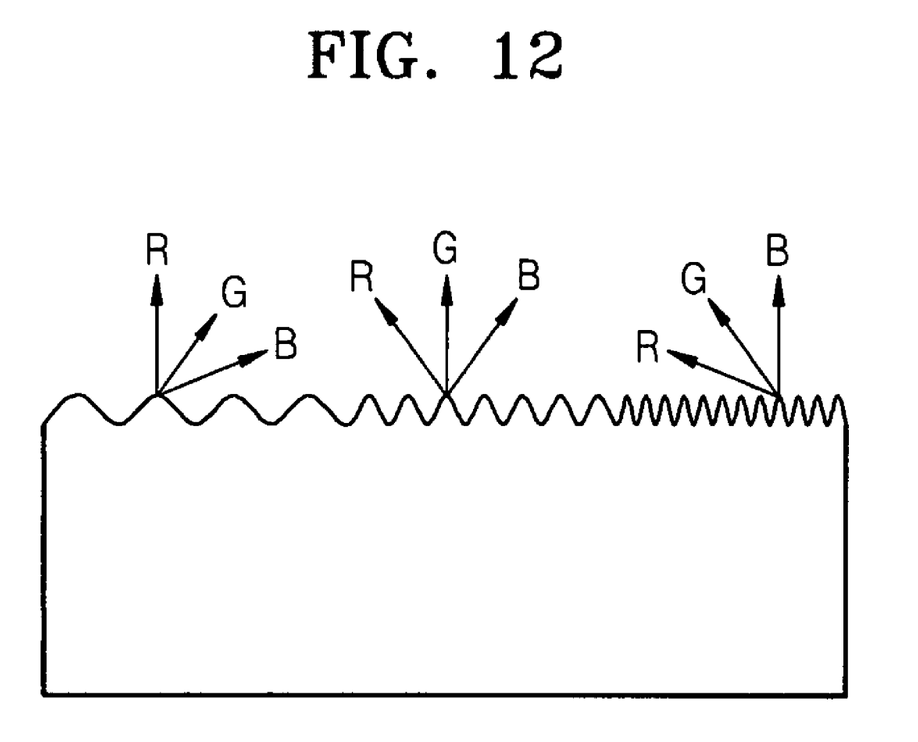
FIG. 12 illustrates the change in exit angles of light by color according to the change in exit location on a diffraction pattern having a continuously varying period distribution.

FIG. 12 illustrates the change in emitted angles of light by color according to the change in emitted location on a diffraction pattern having a continuously varying period on a holographic light guide plate. Referring to FIG. 12, red light may be emitted vertically on the left of the light guide plate, green light may be emitted vertically in the middle, and blue light may be emitted vertically on the right side of the light guide plate. Accordingly, when the size of one diffraction pattern is large, it is possible that color dispersion in a perpendicular direction can be detected, and color dispersion in a lateral direction can also be detected.

Figure 13:
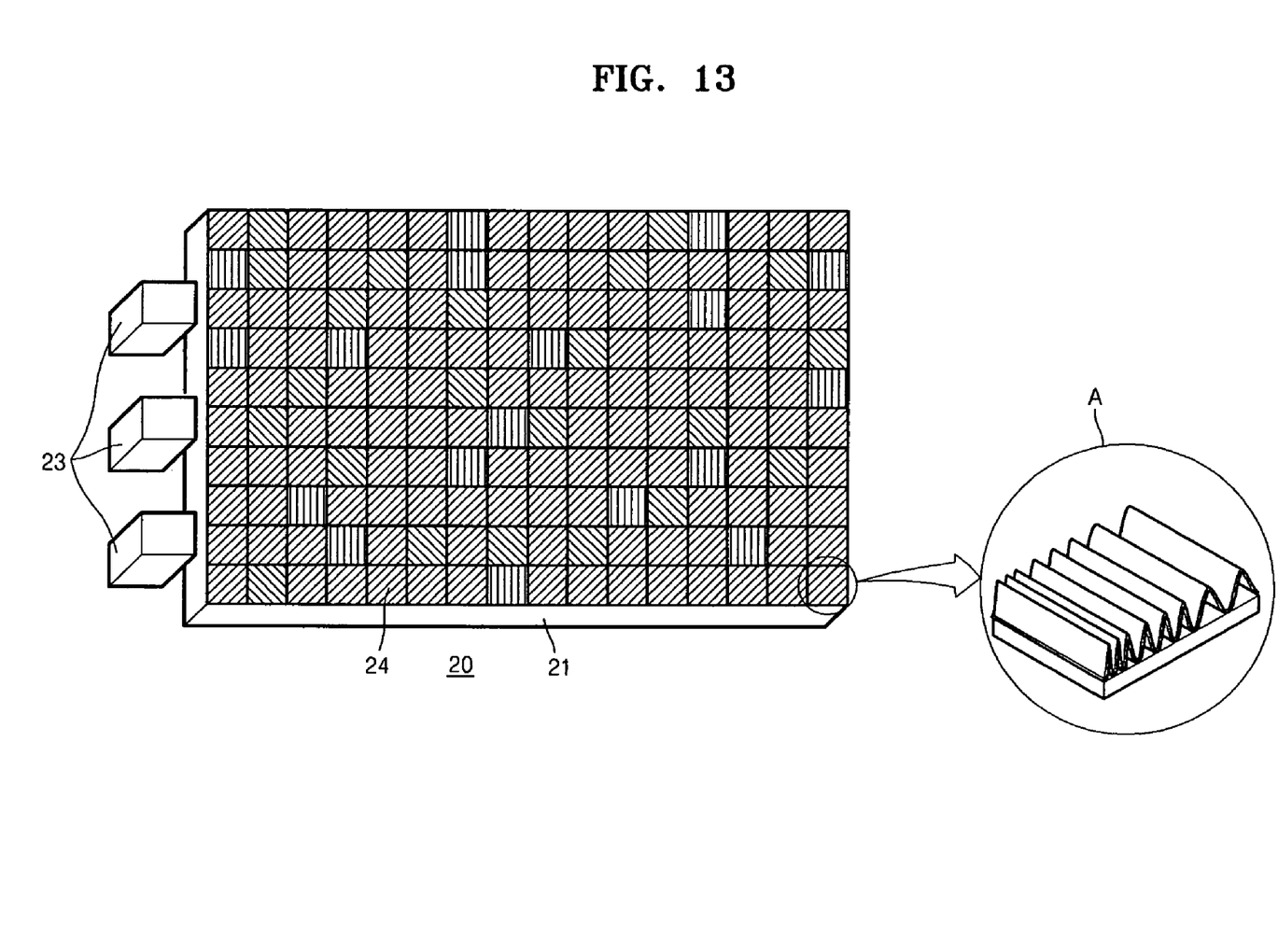
FIG. 13 is a perspective view of holographic light guide plate with a plurality of regions, each formed of diffraction patterns with different continuously varying period distribution.

A holographic light guide plate according to the present invention that is capable of completely compensating color dispersion is illustrated in FIG. 13. Referring to FIG. 13, a holographic light guide plate 20 includes a transparent substrate 21 divided on its top surface into a plurality of small regions, with different types of diffraction patterns 24 formed on each of the regions. Here, the plurality of diffraction patterns 24 formed on the plurality of regions on the transparent substrate 21 are arranged so that their periods and directions are different. That is, the wavelengths and the convergence and divergence of two beams are varied for each region to form a different period distribution of the diffraction pattern 24. Also, the incident directions of the two beams that interfere with one another may be altered for each region, forming diffraction patterns 24 with different directions. Here, each of the diffraction patterns 24 has continuously varying periods, as shown in region A of FIG. 13.

In an exemplary embodiment of the present invention, the size of each region of the holographic light guide plate 20 may be 1 mm×1 mm or less, or several hundred μm×several hundred μm or less. For example, the size of each region may be the approximate size of a unit pixel in a common display device, which is 200-800 μm×200-800 μm. In this case, red, green, and blue light is emitted vertically within one diffraction pattern 24 inside each small region, and color dispersion is compensated for in a vertical direction to achieve white light. Additionally, because the plurality of diffraction patterns 24 have respectively different periods and directions, the amount of red, green, and blue light emitted sideways is evenly distributed, so that color dispersion in a sideways direction can also be compensated. Therefore, in an exemplary holographic light guide plate 20 according to the present invention, color dispersion may be compensated for in both vertical and sideways directions.

The above description was of a diffraction pattern 24 formed on the top surface of a transparent substrate 21; however, the same results may be derived by forming the diffraction pattern 24 on the bottom surface of the transparent substrate 21. That is, the diffraction pattern 24 may be formed on the top or bottom surface of the transparent substrate 21.

In a holographic light guide plate 20 as shown in FIG. 13, a light source is positioned to the side of the transparent substrate 21 as an illumination unit such as a back light unit for a display device. Generally, a plurality of point light sources such as LEDs, or a line light source such as a CCFL, are used as a light source 23. Although not shown in FIG. 13, a diffusing plate, for evenly diffusing light emitted from the top surface of the transparent substrate 21, may be disposed above the top surface of the transparent substrate 21, as shown in FIG. 1. This exemplary illumination unit for a display device using a holographic light guide plate 20 with color dispersion compensation can provide almost completely white light in vertical and sideways directions.

Figure 14:
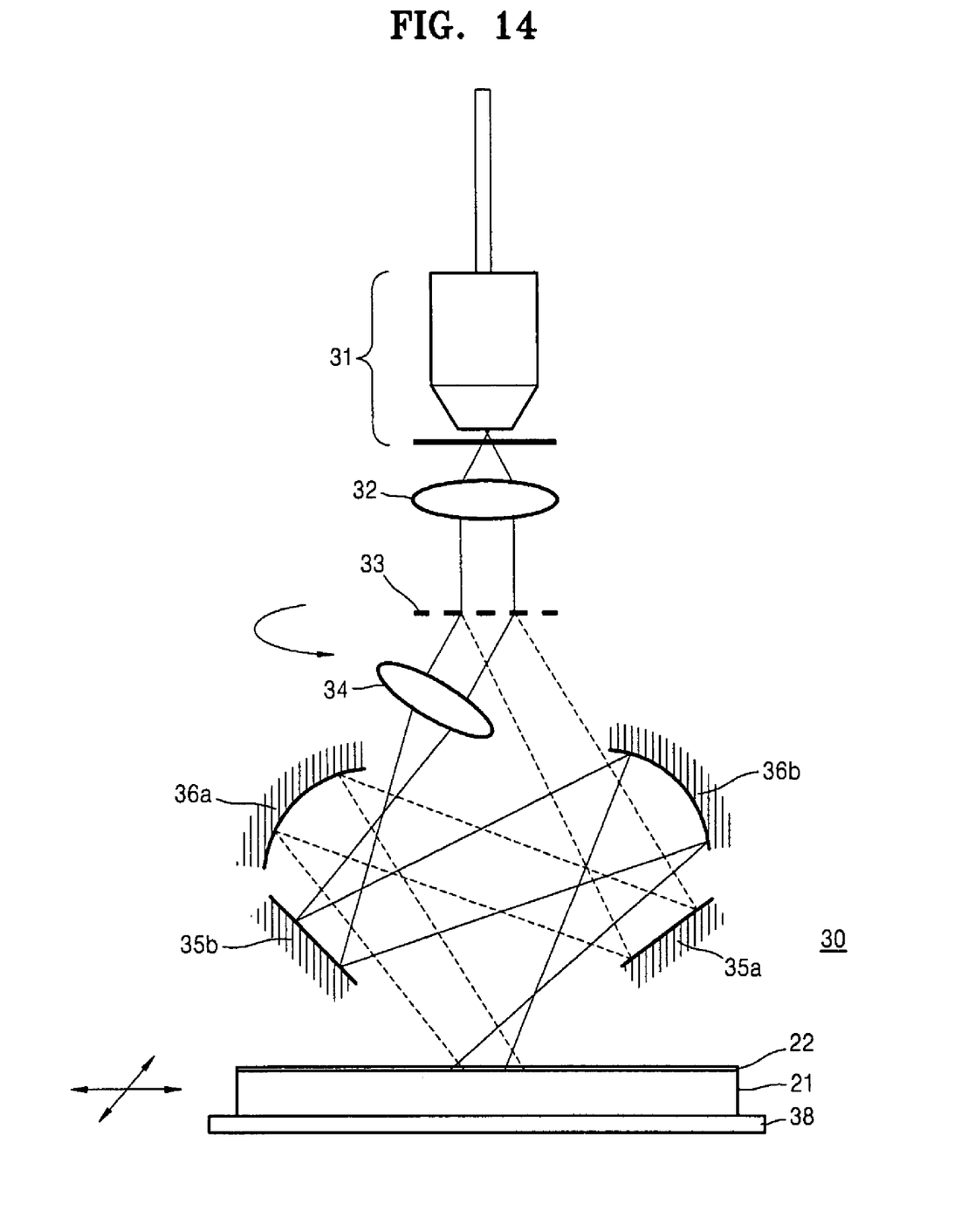
FIG. 14 is a structural view of an exemplary apparatus for forming a diffraction pattern on a holographic light guide plate, according to an exemplary embodiment of the present invention.

FIG. 14 is a structural view of an exemplary apparatus 30 for forming a diffraction pattern on a holographic light guide plate, according to an exemplary embodiment of the present invention. Referring to FIG. 14, the apparatus 30 includes a light source 31 for emitting light, a collimating lens 32 for making the light emitted from the light source 31 parallel, a light divider 33 for dividing the parallel beam into a first beam and a second beam, a support 38 for mounting a transparent substrate 21 upon which a photoresist 22 is applied, first light guiding assembly 35a and 36a for guiding the first beam onto the photoresist 22, a second light guiding assembly 35b and 36b for guiding the second beam onto the photoresist 22, and a lens 34 provided in the path of the first beam or the second beam.

Here, the light divider may be a beam splitter or a holographic optical element (HOE), for example. The support 38 is driven to be capable of lateral, and front-to-rear movement in a horizontal plane. The first and second light guiding assemblies 35a and 36a and 35b and 36b in FIG. 14 respectively may be, for example, a flat mirror and a concaved mirror. However, the light guiding assemblies 35a, 36a and 35b, 36b are configured so that the beam is incident on the photoresist 22, and the convergence/divergence of the beam may be controlled by other means. For instance, the first and second light guiding assemblies may each have only one concave mirror. Although the lens 34 in FIG. 14 is depicted as being in the path of the second beam, the lens 34 may be in the path of the first beam or be disposed in both the paths of the first and second beams.

A detailed description of the operation of the apparatus 30 will now be given. First, the light emitted from the light source 31 is converted to a parallel beam by the collimating lens 32, and then divided into a first beam and second beam by the light divider 33. Next, the first beam is reflected by the first flat mirror 35a and is incident on the first concave mirror 36a. The first beam is reflected again by the first concave mirror 36a, and is converted to a convergent beam. The first beam that has been converted to a convergent beam is incident on the photoresist 22 applied on the transparent substrate 21.

The second beam divided by the light divider 33 is transmitted through the lens 34 and is incident on the second flat mirror 35b. As illustrated in FIG. 14, the distance between the second flat mirror 35b and the lens 34 is greater than the focal distance of the lens 34. Therefore, the second beam incident on the second flat mirror 35b is a divergent beam. Then, the divergent second beam is incident on the second concave mirror 36b. The divergent second beam is then reflected by the second concave mirror 36b and is incident on the photoresist 22. As illustrated in FIG. 14, the distance between the second concave mirror 36b and the photoresist 22 is farther than the focal distance of the second concave mirror 36b, so that the second beam incident on the photoresist 22 is a divergent beam.

The first and second light guiding assemblies 35a and 36a and 35b and 36b are disposed to direct the first and second beams to be incident on the same location on the photoresist 22. Accordingly, as illustrated in FIG. 10, the convergent first beam and the divergent second beam mutually interfere on the photoresist 22. Thus, the diffraction pattern can be obtained, as illustrated in FIG. 11.

When the exposure of one region of the photoresist 22 is thus completed, the support 38 is moved back and forth and laterally to begin exposure of the next region. Here, the lens 34, the first light guiding assembly 35a and 36a, and the second light guiding assembly 35b and 36b may be repositioned so that the varying periods of the interference pattern formed in the next region have a different arrangement than those of the previously formed region. Also, the light source 31, light divider 33, first light guiding assembly 35a and 36a, second light guiding assembly 35b and 36b, and lens 34 may be rotated about a vertical axis in conjunction therewith, so that the direction of light incident on the photoresist 22 can be changed. In this way, the direction of the interference pattern formed on the photoresist 22 can be changed from that of the previously-formed interference pattern.

An exemplary embodiment of the present invention provides a holographic light guide plate that compensates color dispersion in all directions. Further, an exemplary embodiment of the present invention provides an illumination unit for a display device that uses the holographic light guide plate with compensated color dispersion to provide almost completely white light in all directions.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. A holographic light guide plate comprising:
a transparent substrate; and a plurality of diffraction patterns arranged on one of a top surface and a bottom surface of the transparent substrate, wherein the diffraction patterns diffract light incident on the transparent substrate, wherein each of the diffraction patterns has a continuously varying period distribution, and the period distributions of the plurality of diffraction patterns vary within a range of periods through which red, green, and blue light is emitted vertically.

2. The holographic light guide plate of claim 1, wherein the period distributions and directions of the plurality of diffraction patterns are different from each other.

3. The holographic light guide plate of claim 1, wherein the plurality of diffraction patterns are disposed on the top surface of the light guide plate and permit light to be transmitted therethrough.

4. The holographic light guide plate of claim 1, wherein each of the diffraction patterns has an area of not greater than 1 mm$^2$.

5. An illumination unit for a display device, comprising:

a transparent substrate;

at least one light source disposed adjacent to a side of the transparent substrate; and a plurality of diffraction patterns arranged on one of a top surface and a bottom surface of the transparent substrate, wherein the diffraction patterns diffract light incident on the transparent substrate, wherein each of the diffraction patterns has a continuously varying period distribution, and the period distributions of the plurality of diffraction patterns vary within a range of periods in which red, green, and blue light is emitted vertically.

6. The illumination unit of claim 5, wherein the period distributions and directions of the plurality of diffraction patterns are different from each other.

7. The illumination unit of claim 5, wherein the plurality of diffraction patterns are disposed on the top surface of the light guide plate and permit light to be transmitted therethrough.

8. The illumination unit of claim 5, wherein each of the plurality of diffraction patterns has an area of not greater than 1 mm$^2$.

9. The illumination unit of claim 5, further comprising a diffuser sheet disposed above the top surface of the transparent substrate, wherein the diffuser sheet uniformly diffuses the light transmitted through the top surface of the transparent substrate.

* * * * *